J. L. WENMAN.
HARROW.
APPLICATION FILED FEB. 16, 1915.
1,137,560.
Patented Apr. 27, 1915.
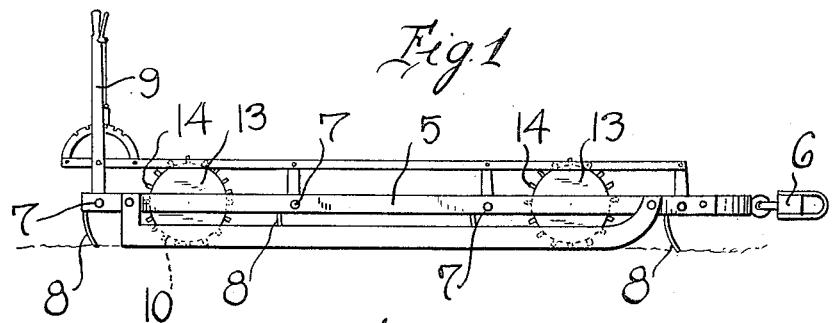
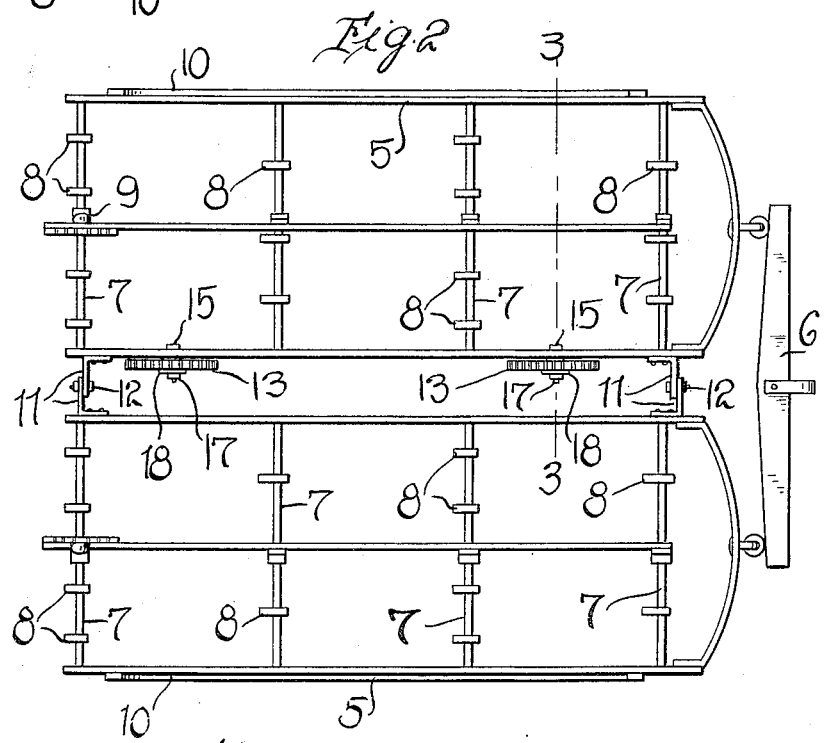
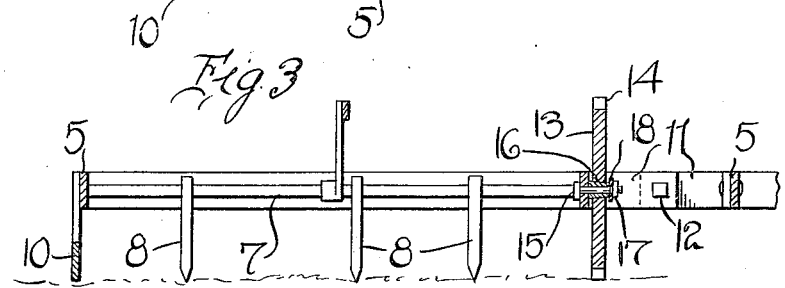
Witnesses
Robert M. Sutphen
A. L. Hint
Inventor
J. L. WENMAN
By Watson E. Coleman
Attorney

UNITED STATES PATENT OFFICE.

JOHN L. WENMAN, OF NEW VERNON, NEW JERSEY.

HARROW.

1,137,560.

Specification of Letters Patent. Patented Apr. 27, 1915.

Application filed February 16, 1915. Serial No. 8,575.

*To all whom it may concern:*

Be it known that I, JOHN L. WENMAN, a citizen of the United States, residing at New Vernon, in the county of Morris and State of New Jersey, have invented certain new and useful Improvements in Harrows, of which the following is a specification, reference being had to the accompanying drawings.

This invention relates to harrows and has for its primary object to provide improved means primarily designed for use in connection with a double frame harrow, for preventing the collection of leaves and trash in front of the harrow teeth.

The invention has for a more particular object to provide spaced harrow frames connected together for relative vertical movement, and peripherally spurred supporting wheels mounted upon the inner longitudinal bar of one of the frames whereby the frames will be vertically agitated in their movement over a field and the gathering or collecting of vines and leaves by the harrow teeth is prevented.

With the above and other objects in view, my invention consists in the novel features of construction, combination, and arrangement of parts to be hereinafter more fully described, claimed, and illustrated in the accompanying drawing, in which, Figure 1 is a side elevation of a harrow showing my invention applied thereto; Fig. 2 is a top plan view; and Fig. 3 is a section taken on the line 3—3 of Fig. 2.

Referring in detail to the drawing, 5 designates the two harrow frames which are of elongated rectangular form in plan, and are connected together at their forward ends in any suitable manner by the draft bar 6. In the longitudinal bars of each of the harrow frames, transverse rocker bars 7 are journaled at their ends and carry a plurality of harrow teeth 8 which are removably attached to said bars in any preferred manner. These rocker bars are actuated in the usual way through rod or link connections to a lever indicated at 9, which is mounted upon the harrow frame.

The outer longitudinal bar of each of the frames 5 is provided with a longitudinally extending runner 10 and to the inner bar of each frame, at the opposite ends thereof, angle plates 11 are secured, said plates having transversely disposed outwardly extending flanges or arms provided with openings to loosely receive the connecting bolts 12. These bolts serve as hinge pintles and permit of a relative vertical movement of the harrow frames.

Upon the inner longitudinal bar of one of the harrow frames 5, spaced wheels 13 are mounted, said wheels having peripheral spurs or teeth 14. These supporting wheels may be provided with bearings of any suitable construction and I preferably employ the axle bolts 15 which are disposed through openings in the frame bar and upon which the axle boxings or bearing sleeves 16 are engaged. Nuts 17 are threaded upon the ends of the axles for clamping engagement with washer plates 18, whereby the supporting wheels are retained in position thereon.

From the above description, it will be seen that the double harrow is provided with outer longitudinal runners and a single pair of intermediate supporting wheels. As the harrow is drawn over the ground, the spur teeth 14 on the periphery of the wheels will cause vertical agitation of the frames and thus effect a release of such vines and other matter as is collected by the harrow teeth so that the same will not become clogged. In the usual harrow of this type, intermediate runners are provided, and by substituting my improved spurred wheels in lieu of these runners, the spurs or teeth will displace such vines, leaves and other matter so that it will not collect beneath the frame and prevent the proper engagement of the harrow teeth with the ground.

While my invention is exceedingly simple in its construction, it has been demonstrated in practical use that the same is highly efficient for the purpose in view. It will, of course, be understood that the device may be applied to any of the various forms of toothed harrows now in general use. The device is also susceptible of considerable modification in the form, proportion, and arrangement of the several parts thereof, and I, therefore, reserve the privilege of resorting to all such legitimate changes as may be fairly embodied within the spirit and scope of the invention as claimed.

Having thus fully described my invention, what I desire to claim and secure by Letters Patent is:—

1. The combination with a harrow including two frames connected together for relative vertical movement and outer longitudinal runners supporting the respective frames, of intermediate peripherally spurred supporting wheels mounted upon the inner longitudinal bar of one frame.

2. The combination with a harrow including two frames arranged side by side and pivotally connected to each other for relative vertical movement, each of said frames being provided with outer longitudinal runners, of spaced supporting wheels journaled upon the inner longitudinal bar of one frame, said wheels being provided with peripheral projections for engagement with the ground to cause vertical agitation of the frames, substantially as and for the purpose specified.

In testimony whereof I hereunto affix my signature in the presence of two witnesses.

JOHN L. WENMAN.

Witnesses:
R. C. MATTHEWS,
WILLIAM N. BEACH.

Copies of this patent may be obtained for five cents each, by addressing the "Commissioner of Patents, Washington, D. C."